US005168285A

United States Patent [19]

Winslow

[11] Patent Number: 5,168,285

[45] Date of Patent: Dec. 1, 1992

[54] MODAL INK JET PRINTING SYSTEM

[75] Inventor: Thomas H. Winslow, Corvallis, Oreg.

[73] Assignee: Hewlett-Packard Company, Palo Alto, Calif.

[21] Appl. No.: 610,886

[22] Filed: Nov. 7, 1990

Related U.S. Application Data

[62] Division of Ser. No. 285,915, Dec. 16, 1988.

[51] Int. Cl.[5] .............................................. G01D 15/18

[52] U.S. Cl. ................................. 346/1.1; 346/140 R

[58] Field of Search ............................. 346/140 R, 1.1

[56] References Cited

U.S. PATENT DOCUMENTS 4,503,443 3/1985 Dagna et al. .................. 346/140 R 4,620,202 10/1986 Koto et al. ...................... 346/140 R

*Primary Examiner*—Benjamin R. Fuller

*Assistant Examiner*—Gerald E. Preston

[57] ABSTRACT

An ink jet pen has two modes of operation, a normal speed mode and a high speed mode. In the normal speed mode, the pen's ink reservoir is maintained at a desired below-atmospheric pressure by a bubble generator orifice that introduces air from an atmospherically vented chamber into the reservoir to relieve the partial vacuum caused by ejection of ink. In the high speed mode, a heater heats air trapped in the ink reservoir. As the air tries to expand, it pressurizes the ink and causes it more quickly to refill the pen's ink-ejecting nozzle after firing. The pen can thus be fired at a faster rate. The bubble generator orifice is blocked during the high speed mode by the first droplet of ink expelled through the orifice, which acts to wet and seal a vent tube.

5 Claims, 1 Drawing Sheet

MODAL INK JET PRINTING SYSTEM

CROSS-REFERENCE TO RELATED APPLICATION

This is a division of application Ser. No. 07/285,915 filed Dec. 16, 1988.

FIELD OF THE INVENTION

The present invention relates to ink jet printing systems, and more particularly to a method and apparatus for permitting an ink jet printing system to controllably operate in a high speed mode.

BACKGROUND AND SUMMARY OF THE INVENTION

Ink jet printers have become very popular due to their quiet and fast operation and their high print quality on plain paper. A variety of ink jet printing methods have been developed.

In one ink jet printing method, termed continuous jet printing, ink is delivered under pressure to nozzles in a print head to produce continuous jets of ink. Each jet is separated by vibration into a stream of droplets which are charged and electrostatically deflected, either to a printing medium or to a collection gutter for subsequent recirculation. U.S. Pat. No. 3,596,275 is illustrative of this method.

In another ink jet printing method, termed electrostatic pull printing, the ink in the printing nozzles is under zero pressure or low positive pressure and is electrostatically pulled into a stream of droplets. The droplets fly between two pairs of deflecting electrodes that are arranged to control the droplets' direction of flight and their deposition in desired positions on the printing medium. U.S. Pat. No. 3,060,429 is illustrative of this method.

A third class of methods, more popular than the foregoing, is known as drop-on-demand printing. In this technique, ink is held in the pen at below atmospheric pressure and is ejected by a drop generator, one drop at a time, on demand. Two principal ejection mechanisms are used: thermal bubble and piezoelectric pressure wave. In the thermal bubble systems, a thin film resistor in the drop generator is heated and causes sudden vaporization of a small portion of the ink. The rapidly expanding ink vapor displaces ink from the nozzle causing drop ejection. U.S. Pat. No. 4,490,728 is exemplary of such thermal bubble drop-on-demand systems.

In the piezoelectric pressure wave systems, a piezoelectric element is used to abruptly compress a volume of ink in the drop generator, thereby producing a pressure wave which causes ejection of a drop at the nozzle. U.S. Pat. No. 3,832,579 is exemplary of such piezoelectric pressure wave drop-on-demand systems.

The drop-on-demand techniques require that under quiescent conditions the pressure in the ink reservoir be below ambient so that ink is retained in the pen until it is to be ejected. The amount of this "underpressure" (or "partial vacuum") is critical. If the underpressure is too small, or if the reservoir pressure is positive, ink tends to escape through the drop generators. If the underpressure is too large, air may be sucked in through the drop generators under quiescent conditions. (Air is not normally sucked in through the drop generators because their high capillarity retains the air-ink meniscus against the partial vacuum of the reservoir.)

The underpressure required in drop-on-demand printing systems can be obtained in a variety of ways. In one system, the underpressure is obtained gravitationally by lowering the ink reservoir so that the surface of the ink is slightly below the level of the nozzles. However, such positioning of the ink reservoir is not always easily achieved and places severe constraints on print head design. Exemplary of this gravitational underpressure technique is U.S. Pat. No. 3,452,361.

Alternative techniques for achieving the required underpressure are shown in U.S. Pat. No. 4,509,062 and in copending application Ser. No. 07/115,013 filed Oct. 28, 1987, both assigned to the present assignee. In the former patent, the underpressure is achieved by using a bladder type ink reservoir which progressively collapses as ink is drawn therefrom. The restorative force of the flexible bladder keeps the pressure of the ink in the reservoir slightly below ambient. In the system disclosed in the latter patent application, the underpressure is achieved by using a capillary reservoir vent tube that is immersed in ink in the ink reservoir at one end and coupled to an overflow catchbasin open to atmospheric pressure at the other. As the printhead draws ink from the reservoir, the reservoir pressure falls below ambient. This underpressure increases as ink is ejected from the reservoir. When the underpressure reaches a threshold value, it draws a small volume of air in through the capillary tube and into the reservoir, thereby preventing the underpressure from exceeding the threshold value.

The maximum print rate in drop-on-demand printers is limited by the recharge time of the capillary tube that provides ink to the drop generator. If the drop generator is fired more quickly that the capillary tube can supply ink, the droplets comprising the ink jet will be incompletely formed and some may be omitted entirely.

There is a long felt and increasing need for higher speed ink jet printers, especially with for use in print-intensive applications, such as the printing of graphical images. Existing ink jet pens have been optimized to obtain every possible speed advantage, such as by exploitation of the oscillation of the ink in the drop generator to speed the rate at which droplets can be ejected, yet the need for still faster ink jet printers persists.

It is an object of the present invention to fulfill this need.

It is a more particular object of the present invention to provide an ink jet pen that has two modes of operation: a regular speed mode and a high speed mode.

It is another more particular object of the present invention to provide an ink jet pen that can selectably supply ink to the drop generator at either a negative pressure or at a positive pressure.

It is still another more particular object of the present invention to provide an ink jet pen that can automatically close a vent in its ink reservoir so that a positive pressure can be maintained therein.

According to one embodiment of the present invention, an ink jet pen is provided with a electrical heating element that can be selectably energized to heat air in the ink reservoir and thereby increase the pressure on the ink therein. This positive pressure drives the ink more rapidly through the tube feeding the drop generator and permits the pen to print at a faster rate.

When the heating element is not energized, the partial vacuum left in the reservoir by the ejection of ink is moderated by the introduction of air through a bubble generator orifice. This orifice is sized so that a negative reservoir pressure of about 5 inches of water is required before a bubble of air can be drawn through the orifice and into the ink. By this arrangement, the reservoir pressure is regulated at the "bubble pressure" when the heating element is not energized.

The pressure in the reservoir is also regulated when the heating element is energized. The positive pressure in the reservoir would normally tend to drive ink out the bubble generator orifice. In the present invention, however, the ink is prevented from draining out the bubble generator orifice until the reservoir pressure exceeds a positive threshold value. When that pressure is exceeded, a volume of ink is forcibly expelled. This expulsion of ink relieves a portion of the positive pressure in the reservoir and keeps the reservoir pressure below the positive threshold value.

In one embodiment, ink is prevented from draining out the bubble generator orifice when the heating element is energized by a novel arrangement of components in the catchbasin chamber to which the orifice leads. This chamber is vented to the atmosphere through a chimney that extends into the chamber and terminates with its opening opposite the bubble generator orifice. When ink begins to be driven by a positive pressure from the reservoir through the bubble generator orifice and into the chamber, the ink seals the opening in the chimney, thereby isolating the chamber from ambient pressure. Thereafter, positive pressure in the ink reservoir caused by the heating of air therein is relieved by forcing ink to the print nozzles at a faster rate during printing.

If the heating element is not energized and the pressure in the reservoir rises above ambient due to environmental conditions, the above-described ventblocking mechanism is disabled and the positive pressure in the reservoir is relieved by discharging ink to the catchbasin.

The foregoing and additional objects, features and advantages of the present invention will be more readily apparent from the following detailed description, which proceeds with reference to the accompanying drawings.

DETAILED DESCRIPTION

Figure 1:
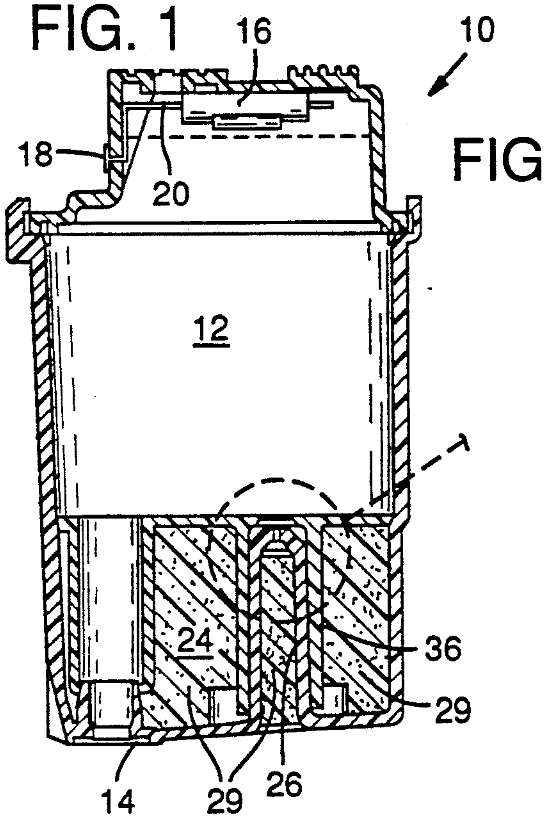
FIG. 1 is a sectional view of an ink jet pen according to one embodiment of the present invention.
Figure 2:
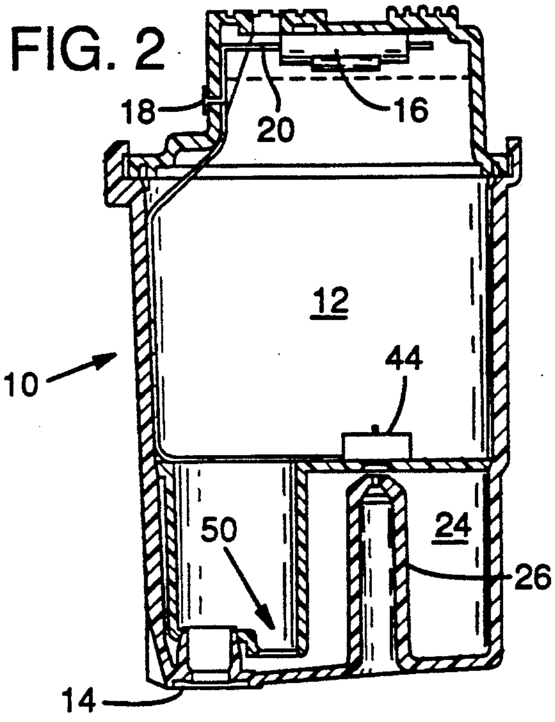
FIG. 2 is a sectional view of an ink jet pen according to another embodiment of the present invention.

Referring to FIGS. 1 and 2, an ink jet pen 10 according to one embodiment of the present invention includes an ink reservoir 12 that supplies ink to a drop generator 14. Positioned in an upper portion of the reservoir 12 is a resistive heating element 16 that is coupled to contacts 18 on the outside of the pen 10 by wires 20. When the resistive heating element 16 is energized by application of a suitable voltage to contacts 18, the air in the top of the reservoir is heated and tries to expand according to the ideal gas laws. Since the reservoir is substantially sealed, as described in detail below, the heated air cannot expand and instead becomes pressurized. This positive pressure is exerted on the ink in the reservoir and urges it into a tube that supplies ink to the drop generator 14. This pressurized supply of ink through the capillary tube permits the drop generator to be operated at a higher repetition rate than in the prior art with no impairment in droplet formation, thereby permitting higher printing rates.

When this high speed printing mode is no longer desired, the supply of voltage to the resistive heating element 16 is interrupted. Air convection currents, radiation, conduction and air expansion then cool the air in the pen and return the pen to a normal print speed mode in which the reservoir is operated at an underpressure.

Figure 1A:
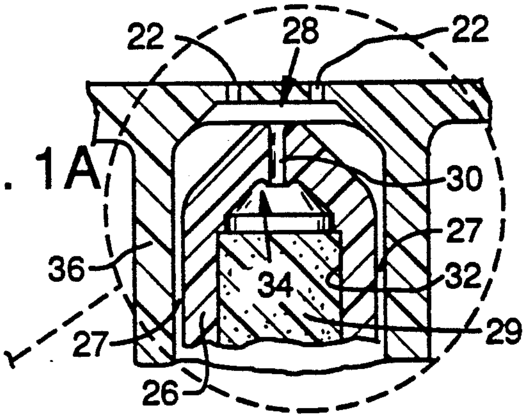
FIG. 1A is an enlarged detail showing the reservoir venting arrangement used in the ink jet pen of FIG. 1.

In the normal print speed mode, the ejection of ink from the reservoir 12 leaves a partial vacuum therein that is moderated by the occasional introduction of an air bubble into the reservoir through one or more bubble generator orifices 22 (FIG. 1A). The orifices 22 are sized so that a negative reservoir pressure of approximately 5 inches of water is required before a bubble of air can be drawn through an orifice and into the ink. In the illustrated embodiment, the bubble generator orifices have diameters of 0.0078 inches. Every time the partial vacuum in the reservoir exceeds five inches of water (the "bubble pressure"), another air bubble is introduced into the reservoir and the pressure therein is correspondingly reduced. By use of these small orifices, the pressure in the reservoir is prevented from reaching atmospheric pressure and is instead regulated at the "bubble pressure" during the normal printing mode.

It will be recognized that for the reservoir 12 to be operated at a positive pressure, as is required in the high speed print mode, the bubble generator orifices 22 must somehow be disabled. If they are not, the orifices would permit ink to escape from the reservoir 12 and relieve the positive pressure therein. In the preferred embodiment, this disabling function is performed by a novel arrangement of components in the chamber 24 (also termed a "catchbasin") to which the orifices lead. Chamber 24 is vented to the surrounding air through a chimney 26 that extends into the chamber and terminates with a chamfered opening 28 positioned a small distance away from the bubble generator orifices, as shown in FIG. 1A.

In the high speed print mode, the rapidly increasing reservoir pressure drives droplets of ink through the bubble generator orifices 22 and into an annular metering area 27 that is defined between the outside surface of chimney 26 and the inside surface of a collar 36 extending downwardly around the chimney. The rapid secretion of the droplets through the bubble generator orifices 22 soon blocks this narrow annular passageway 27 and forms a low pressure seal to the catchbasin 24, isolating this chamber from the reservoir. Continued secretion of ink droplets through the bubble generators 22 collects on this seal and soon rises to the point that it floods the chamfered opening 28 on the top of the chimney, thereby blocking the vent to atmospheric pressure.

The geometry of chimney 26 is designed so that the surface tension of an ink drop caught therein can support a desired positive pressure so as to effectively seal the chimney and thus the orifice 22. In the illustrated embodiment, this geometry includes a small diameter bore 30 leading from the chamfered opening to a large diameter bore 32. A circumferentially extending pocket or undercut 34 extends about the top of the large diameter bore 32 immediately adjacent the point at which the small diameter bore 30 meets the large diameter bore 32. This pocket 34 fills with ink when ink is introduced into the chamfered opening 28. The ink's surface tension holds the ink in this location and increases the pressure required to clear the chimney of this blockage.

After the chamfered opening has been blocked, the positive pressure in the reservoir can no longer be relieved through the vent chimney 26. Instead, the reservoir pressure can only be relieved by forcing ink more rapidly through the ink nozzle and out towards the printing medium, resulting in increased print density.

(The geometry of the illustrated vent also permits it to serve as a pressure relief valve, permitting the ink blocking the opening to be blown out through the chimney if the reservoir pressure exceeds a desired maximum value.)

When the heating resistor 16 is initially energized, it is energized with a high current to rapidly bring the pen to its high speed print mode. Once the vent chimney 26 is blocked and the pen is operating in the desired positive pressure condition, the resistor heating current can be reduced to a lower value for the duration of the high speed operation. The resistor continues to be energized with this lower current so long as the print buffer is filled with data to be printed in the high speed mode.

Once the print buffer is no longer full of data to be printed in the high speed mode, current to the heating resistor is interrupted. The pen continues to operate at the increased print density for the interval required to empty the print buffer of this data. The pen is then moved to a "spit" station at which the remaining positive pressure in the reservoir is relieved by permitting a small quantity of ink to drool out the print nozzles and into a trough or blotter.

The pen is next moved to a "service station" at which it rests until cooled to nearly ambient. During this cooling interval, pressure in the reservoir decreases to below ambient, to about negative 3 or 4 inches of water. The ink trapped in the chamfered opening 28 or the chimney 26 is drawn through the bubble generator orifices 22 and into the reservoir by the partial vacuum therein, as is ink in the annular metering area 27. When the liquid meniscus blocking the vent chimney 26 pulls free, the reservoir can reequilibrate to the bubble generator set point, i.e. a pressure corresponding to negative five inches of water. The pen is then ready to resume printing in the normal print mode.

While reservoir pressure is deliberately increased above ambient in the high speed print mode, a similar pressure change may be caused by environmental effects, such as an increase in ambient temperature or an increase in altitude. However, in these latter situations, a pen according to the preferred embodiment of the present invention does not operate in the same manner as it does in the high speed mode. Instead, it compensates for such atmospheric changes and permits the positive pressure to be bled from the reservoir.

The reason the pen can respond differently to these two similar conditions is the difference in the rate at which the reservoir pressure increases. Since the atmospherically induced changes occur slowly relative to the resistive heating-induced changes, the ink is not forced into the annular metering area at the high rate required to flood this area and form a seal. Instead, the ink forced through the bubble generator orifices 22 wets the plastic material defining the annular metering area, is acted on by its surface energy and moves down the metering area to the bottom of the catchbasin 24. Ink pooling on the bottom of the catchbasin soon comes into contact with foam 29 that fills most of the catchbasin and wicks the ink away from the chimney. Continued changes in atmospheric conditions which cause further increases in reservoir pressure continue to be relieved by the drooling of ink out the reservoir, down the annular metering area 27 and into the catchbasin foam 29. The annular metering area is never blocked during this slow process, so the vent chimney 26 is never occluded. The reservoir is thus permitted to bleed any positive pressure down to ambient and operation of the pen will further reduce reservoir pressure down to the bubble pressure.

While the illustrations show two bubble generator orifices, there may be a greater or lesser number. In one embodiment, there are six orifices, symmetrically positioned about the top of the chimney. In the high speed print mode, all of the orifices drool ink which seals the annular metering area and blocks the vent chimney. In the regular speed print mode, however, only one of the orifices is usually operative—the one with the largest diameter. (Due to manufacturing tolerances, each of the orifices will have a slightly different diameter. The bubbles will be preferentially drawn through the orifice with the largest diameter since it presents the path of least resistance.)

FIG. 2 shows an alternative embodiment of the present invention wherein a valve 44 is provided to controllably stop the flow of ink through the bubble generator(s) during the high print rate mode. This valve 44 is electrically operated from the same control lines as operate the heating element 16. Consequently, the valve 44 is shut whenever the heating element is energized. When valve 44 is shut, the pressure in the reservoir is permitted to build. A pressure relief system is desirably provided in such an embodiment to prevent the reservoir pressure from exceeding a desired maximum value. A variety of such pressure relief means are known and could be used in this application.

In still other embodiments, the pressure relief feature can be omitted if the heater is thermostatically controlled. For example, in the illustrated embodiments, a 5 inch of water positive pressure that may be desired in the high speed print mode can be achieved by heating the air in the reservoir thirty degrees Fahrenheit above ambient. (This value, of course, is dependent on the volume of air in the reservoir.) By placing a thermistor or other thermoelectric transducer in the reservoir, the temperature therein can be monitored and used to control the application of power to the heating element.

Figure 3:
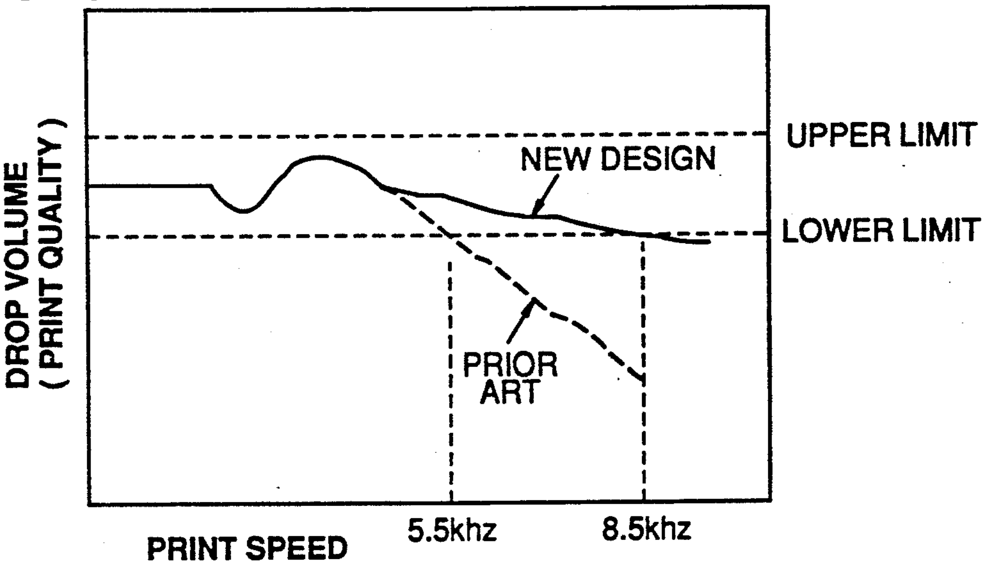
FIG. 3 is a chart comparing the relationship between print quality and print speed for prior art ink jet pens versus the ink jet pen of the present invention.

FIG. 3 is a graph comparing the print quality achieved in a comparable prior art ink jet pen with the print quality attainable by the present invention in the high print rate mode, as a function of print rate. As can be seen, for both systems, the print quality falls below an acceptable range when the print rate exceeds a certain value. In the present invention, however, this value is higher than in the prior art. In the prior art, the print quality becomes unacceptable when the print rate exceeds about 5500 drops per second. In the high speed print mode of the present invention, a print rate of 8500 drops per second can be attained with acceptable quality.

To attain the higher print rates possible by use of the present invention, the carriage that moves the ink jet pen relative to the printing medium must be moved at a commensurately higher rate. That is, the pen carriage must move the pen at different speeds depending on the printing mode in which the pen is operating. Alternatively, the carriage can be moved at a fixed rate irrespective of the mode of the pen. In this instance, it is the print density that increases in the second mode, since the pen is ejecting ink at a faster rate and thereby increasing the number of ink droplets applied per unit area of printing medium. In a final embodiment, rather than having a two mode system (in which the heating element is either on or off), the heating element is provided with a variable control current so that the pressure in the reservoir can be set to any desired positive pressure. In this embodiment, the print density can be modulated as desired by providing a correspondingly modulated electrical signal to the heating element. Analog grey scaling of the printed output can thus be achieved.

Having described and illustrated the principles of my invention with reference to a preferred embodiment and several variations thereof, it should be apparent that the invention can be modified in arrangement and detail without departing from such principles. For example, while the invention has been illustrated with reference to a bubble generator/chimney arrangement positioned in an upper floor of the reservoir, in other embodiments these elements or their equivalents can be provided advantageously at the bottom of a well that extends downwardly from the upper part of the reservoir, adjacent the drop generator, as is shown at numeral 50 in FIG. 2. Similarly, while the invention has been illustrated with reference to a resistive element used to increase the reservoir pressure by heating the air therein, in alternative embodiments other conventional pressure increasing mechanisms can be employed, such as devices that physically reduce the volume of the reservoir. Finally, while the invention has been illustrated with reference to an embodiment wherein the positive reservoir pressures caused by environmental factors are relieved by venting ink from the reservoir, in alternative embodiments the same relief pressure can be achieved by venting air instead.

In view of the wide range of embodiments to which the principles of the present invention can be applied, it should be understood that the apparatuses described and illustrated are to be considered illustrative only and not as limiting the scope of the invention. Instead, my invention is to include all such embodiments as may come within the scope and spirit of the following claims and equivalents thereof.

I claim:

1. A method of operating a drop-on-demand ink jet pen that includes an ink reservoir and a drop generator coupled thereto, comprising the steps:

maintaining the pressure in the reservoir below ambient during a first operational mode; and selectably increasing the pressure in the reservoir to above ambient during a second operational mode.

2. The method of claim 1 which further comprises the step:

moving the pen at a substantially constant rate relative to the printing medium during printing regardless of the operational mode of the pen.

3. The method of claim 1 which further comprises the step:

moving the pen relative to the printing medium, during printing, at a first rate when the pen is operating in said first operational mode; and moving the pen relative to the printing medium, during printing, at a second rate when the pen is operating in the second mode.

4. In an ink jet printing system having an ink reservoir, a method for modulating print density comprising the steps:

providing a modulated electrical signal; and varying the pressure in the ink reservoir in response to said signal.

5. The invention of claim 4 in which the ink jet printing system includes a drop-on-demand printhead of the thermal bubble type coupled to the ink reservoir.

* * * * *